United States Patent [19]
Liegat

[11] Patent Number: 5,613,831
[45] Date of Patent: Mar. 25, 1997

[54] APPARATUS FOR THRUST COMPENSATION ON SHAFT OF ROTARY PUMP

[75] Inventor: Siegfried Liegat, Bruchsal, Germany

[73] Assignee: Sulzer Pumpen AG, Winterthur, Switzerland

[21] Appl. No.: 485,054

[22] Filed: Jun. 7, 1995

[30] Foreign Application Priority Data

Jul. 25, 1994 [EP] European Pat. Off. .............. 94810440

[51] Int. Cl.$^6$ ..................................................... F04D 29/04
[52] U.S. Cl. ........................................... 415/229; 417/365
[58] Field of Search .................................. 415/104, 105, 415/106, 229; 417/423.12, 365

[56] References Cited

U.S. PATENT DOCUMENTS

| | | | |
|---|---|---|---|
| 3,614,181 | 10/1971 | Meeks ........................................ | 308/10 |
| 5,127,792 | 7/1992 | Katsuta et al. ........................... | 415/104 |
| 5,152,679 | 10/1992 | Kanemitsu et al. .............. | 417/423.4 X |
| 5,216,308 | 6/1993 | Meeks ...................................... | 310/90.5 |
| 5,248,239 | 9/1993 | Andrews ................................. | 415/105 |
| 5,310,311 | 5/1994 | Andres et al. ........................... | 415/229 |
| 5,355,042 | 10/1994 | Lewis et al. ............................ | 310/90.5 |
| 5,445,494 | 8/1995 | Hanson ................................ | 417/423.12 |
| 5,470,208 | 11/1995 | Kletschka ........................... | 417/423.12 |

FOREIGN PATENT DOCUMENTS

| | | |
|---|---|---|
| 0523002 | 1/1993 | European Pat. Off. . |
| 2367939 | 5/1978 | France ................................... 310/90.5 |
| 3802950A1 | 8/1989 | Germany . |
| 3802950C1 | 10/1992 | Germany . |
| 2066380 | 7/1981 | United Kingdom . |

OTHER PUBLICATIONS

Yonnet, Jean Paul, "Permanent Magnet Bearings and Couplings" in: IEEE Transactions On Magnetics, vol. MAG17. No. 1, Jan. 1981, pp. 1159–1173.

Soviet Inventions Illustrated, Section PQ, Week 8642, Oct. 30, 1986. Derwent Publications Ltd., London, GB; Class Q56, AN 86–277273 & SU–A–1 213 256 (Gusko) Mar. 23, 1986. Abstract.

Primary Examiner—Edward K. Look
Assistant Examiner—Michael S. Lee
Attorney, Agent, or Firm—Townsend and Townsend and Crew

[57] ABSTRACT

A pressure compensation system for a rotary pump prevents axial displacement of the pump shaft. The pump includes a shaft rotatable about a major axis extending centrally of the shaft, at least one impeller attached to the shaft, and a pump housing for enclosing the shaft and at least one pump impeller for generating fluid pressure for pumping upon rotation of the shaft and the at least one impeller. In these pumps, the fluid pressure can exert an axial thrust along the major axis of the shaft. Therefore, such pumps include means for thrust compensation during rotation of the shaft. The improvement in the means for thrust compensation includes a first set of permanent magnets arrayed around and attached to the shaft and a second set of permanent magnets arrayed on the pump housing. The second set of permanent magnets magnetically attracts the first set of permanent magnets to hold the shaft and the at least one impeller at a fixed position along the major axis of the shaft with respect to the pump housing. Upon rotation of the shaft generating the axial thrust along the major axis of the shaft, the first set of permanent magnets and the second set of permanent magnets oppose movement of the shaft along the major axis of the shaft with respect to the housing.

9 Claims, 4 Drawing Sheets

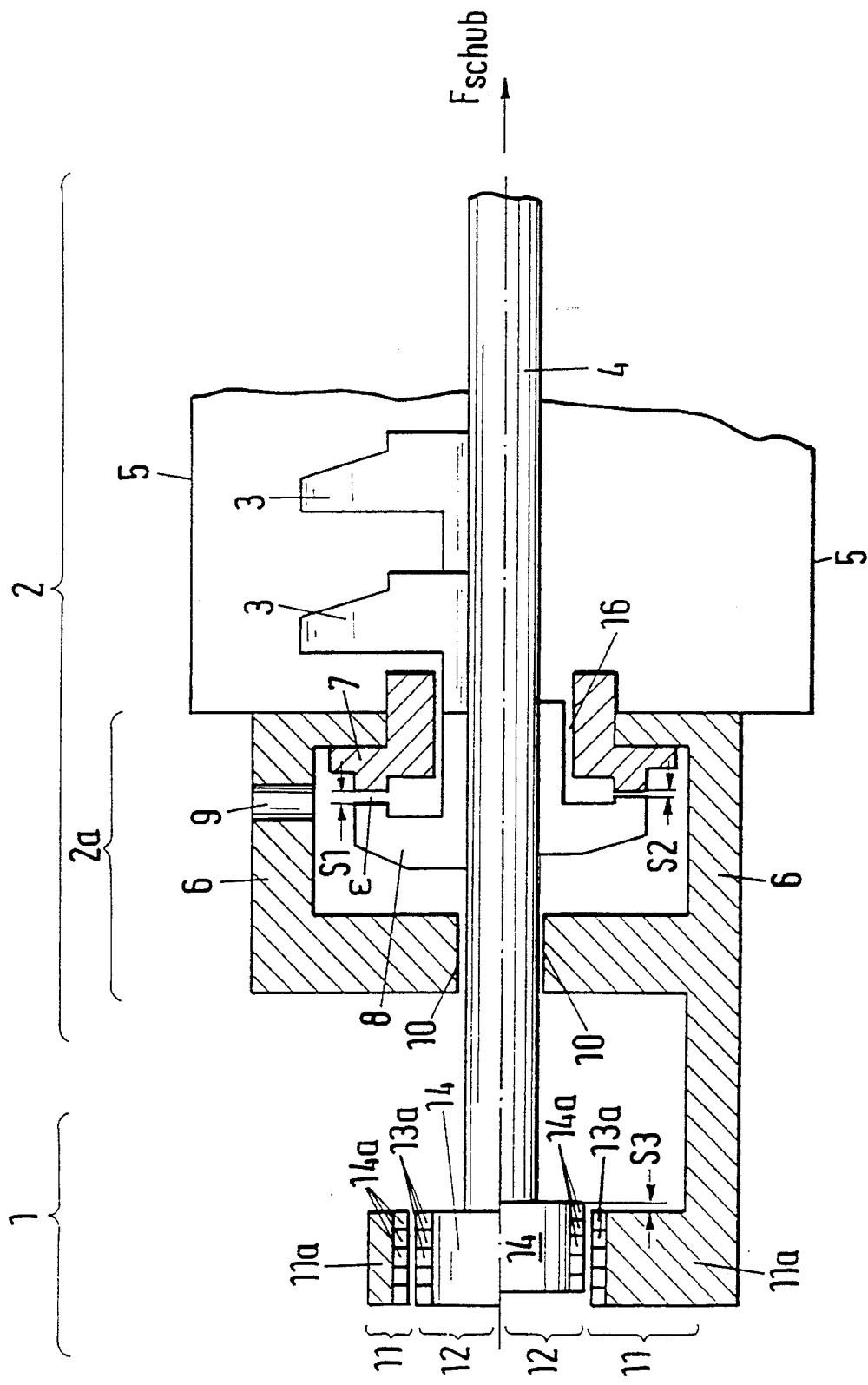

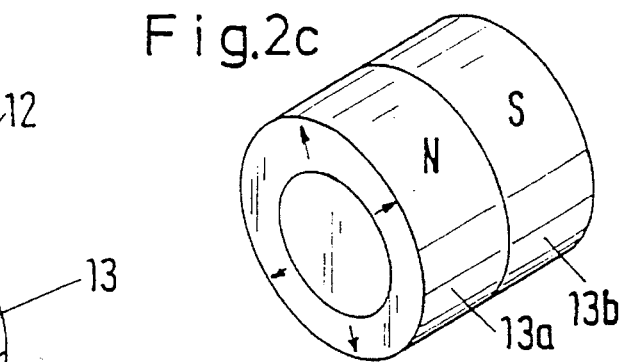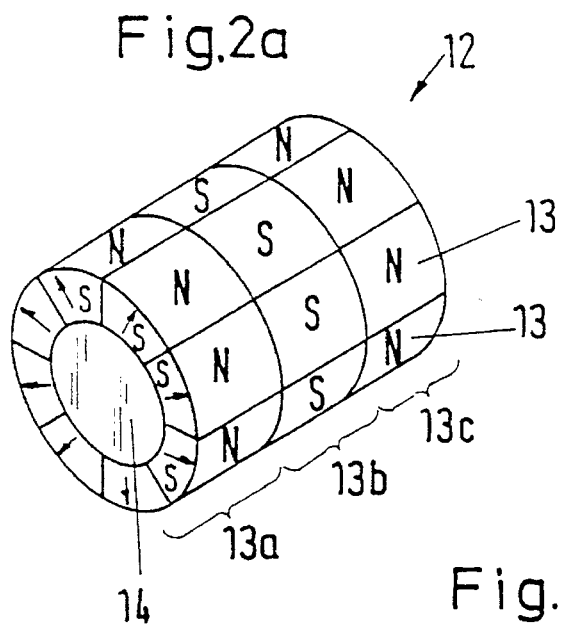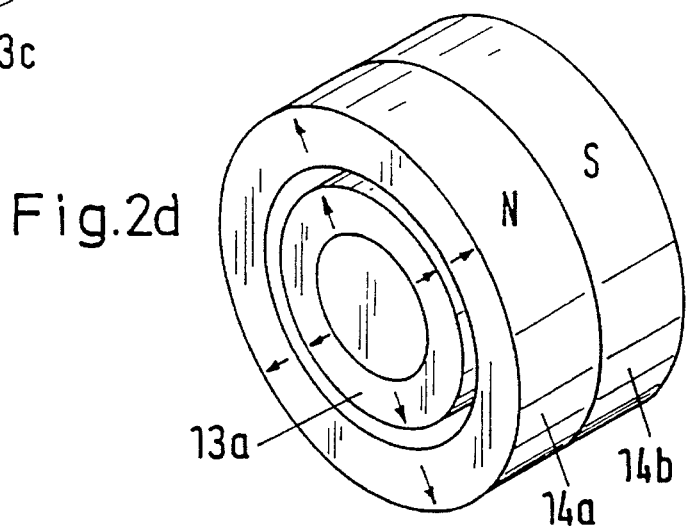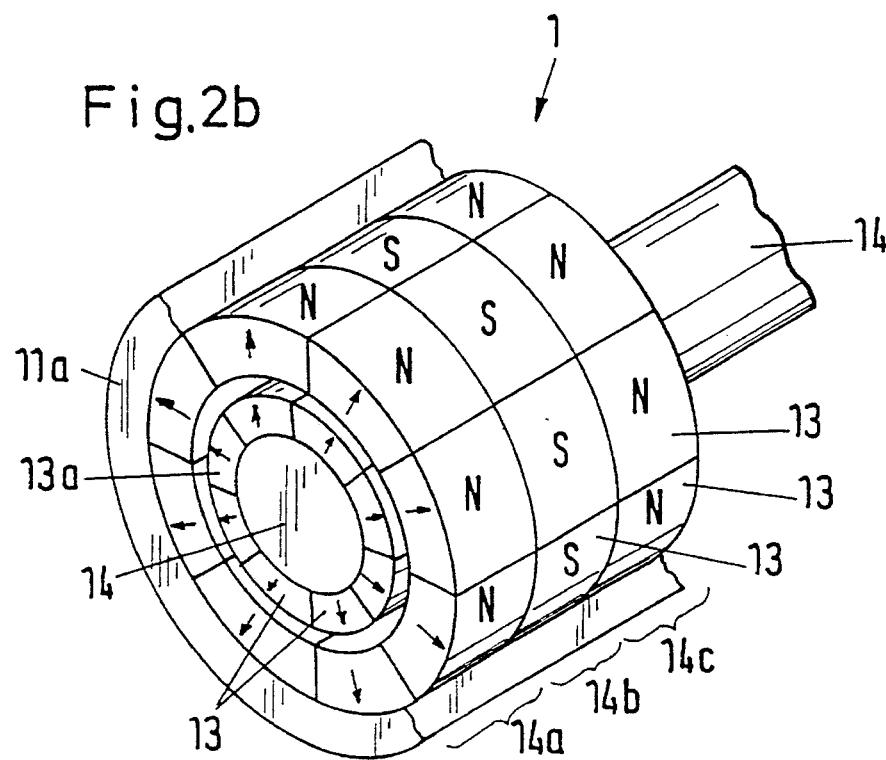

APPARATUS FOR THRUST COMPENSATION ON SHAFT OF ROTARY PUMP

This invention relates to rotary pumps which have axial thrusts develop on the shafts of such pumps during operation. More particularly, a system of compensating such pumps is disclosed utilizing permanent magnets attached to the rotating shaft and stationary housings of such pumps to prevent abrasion of the pump parts, particularly during pump start up.

A rotary pump with a relief apparatus and with an electromagnetic bearing is known from EP-0-355 796 A2. Relief apparati have been used for a long time in order to compensate the axial thrust in an operating rotary pump. A typical relief apparatus of a rotary pump comprises a rotating relief disk and a fixed relief counter-disk, which form a gap extending in the radial direction through which a part of the fluid which is under pressure in the rotary pump flows to the outside. By means of this, the shaft of the rotary pump is held in a state of equilibrium in the axial direction between the force brought about by the axial thrust and the counter-force brought about by the relief apparatus. Transitional phases can occur during the operation of the rotary pump, for example, during the start-up or the shut-down, during which the fluid can have a low pressure, so that the shaft cannot be held in a state of equilibrium. In such a transitional situation, the danger exists that the two disks of the relief apparatus can contact one another, which could damage them. In order to prevent such damages, the patent specification initially cited suggests to control the axial position of the shaft during the transitional phase or during the standstill of the rotary pump via a controlled electromagnet in such a manner that the two disks of the relief apparatus do not contact one another.

SUMMARY OF THE INVENTION

This object is satisfied in accordance with the invention through the object with the features defined in claim 1. The dependent claims 2 to 12 relate to advantageous further embodiments of the invention. Claim 13 relates to a rotary pump with a apparatus in accordance with the invention.

The apparatus in accordance with the invention for the generation of an axial thrust on a axially displaceable rotor shaft of a rotary pump comprises a first body which can be connected to the rotor shaft, the first body having a permanent magnet or an arrangement of permanent magnets, as well as a stationary second body which also has a permanent magnet or an arrangement of permanent magnets, with the two permanent magnets or the arrangements of permanent magnets being associated with one another in such a manner that the magnetic forces brought about hold the rotor shaft in a resting position, or in the case of a displacement caused by the operation of the rotary pump from the resting position, the magnetic forces act on the rotor shaft in such a manner that they generate a force which is opposed to the direction of displacement.

The apparatus in accordance with the invention with permanent magnets has the advantage that a regulation which is costly and complicated with sensors, controller outputs, and electromagnets which can be controlled can be done without. The apparatus in accordance with the invention is very easy to maintain and is insensitive to faults. A further advantage can be seen in that the apparatus in accordance with the invention can be attached in a simple manner to rotary pumps which are already present.

In an advantageous embodiment, the permanent magnets are annularly arranged in such a manner that the permanent magnets of the first and of the second body lie over one another in a resting position in the radial direction, and are magnetized in the same direction in the radial direction. An advantage of this embodiment can be seen in that the first body can be displaced in the axial direction to a width of the permanent magnet (ring width).

In an advantageous further embodiment, several ring-shaped permanent magnets are arranged next to one another in the axial direction, with permanent magnets which lie next to one another being magnetized in the opposite directions. An advantage of this embodiment can be seen in that the maximum force acting in the axial direction can be determined by the amount of permanent magnets which lie next to one another.

The apparatus in accordance with the invention having permanent magnets comprises a plurality of concrete embodiments. In principle, the permanent magnets are to be arranged with respect to their direction of magnetization in the first and second body in such a manner that their mutual allocation effects a force which is disposed opposite to the direction of displacement during an axial displacement of the first body which can be connected to or which is connected to the rotor shaft. In this case, the rotor shaft can be arranged in the horizontal, vertical, or in any other desired direction.

BRIEF DESCRIPTION OF THE DRAWINGS

The invention will now be described in the following by way of working examples in which:

FIG. 1 is a longitudinal section through a rotary pump particularly illustrating the generation of axial thrust, a conventional opposed disc member for combating axial thrust, and a magnet array for preventing axial thrust in accordance with this invention with the upper half of the figure illustrating the pump when operation does not occur and the lower half of the figure illustrating the pump just as rotation and axial thrust begin to occur;

FIG. 2*a* is a perspective view of the shaft of a pump having magnets arrayed around the pump;

FIG. 2*b* is a perspective view of the shaft and magnets of FIG. 2*a* showing the housing attached magnets arrayed around the magnet array;

FIG. 2*c* is a perspective view of a ring magnet array around the shaft of a pump;

FIG. 2*d* is a perspective view of the ring magnet array of FIG. 2*c* having the housing attached magnets arrayed around the magnet array;

FIG. 1 shows a multistage rotary pump 2 which comprises a pump housing 5, a rotor shaft 4, as well as two pump wheels 3 which are connected to the rotor shaft 4. A relief apparatus 2*a* with a housing 6 is arranged at the pump housing 5 in the axial direction, with the relief apparatus 2*a* comprising a rotating relief disk 8 connected to the rotor shaft 4 and a stationary relief counter-disk 7 connected to the housing 6. FIG. 1 shows the position of the rotor shaft 4 in two different states of operation. A standstill is represented in the upper half, whereas an operation of the rotary pump is represented in the lower half. The rotary pump delivers a fluid during the operation, which causes an axial thrust force $F_{Schub}$ (=$F_{thrust}$) On the rotor shaft 4, which is compensated by the relief apparatus 2a. A part of the fluid which is under pressure in the housing 5 flows through the radially extending gap; which is formed between the relief disk 8 and the relief counter-disk 7, via the opening 16 and runs off via the outlet opening 9. By means of this, a counter-force which compensates the thrust force $F_{Schub}$ is generated. The width S2 of the axial gap; is, among other things, dependent on the pressure of the fluid as well on the axial thrust force $F_{Schub}$.

Figure 3A:
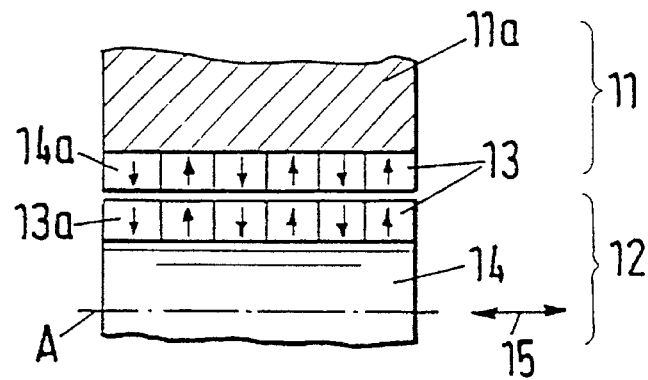
FIGS. 3*a*–3*e* are respective sections taken through the shaft and housing illustrating various magnet arrays that are operable with this invention.

The rotor shaft 4 is connected to a magnetic lift off apparatus 1 which exercises a force acting opposite to the thrust force $F_{Schub}$ on the rotor shaft 4, in order to prevent a contacting of the relief disk 8 with the relief counter-disk 7. In the represented embodiment, the lift off apparatus 1 has a movable, cylindrical body 12 with an interior body 14 whose radial outer surface is covered with several permanent magnetic rings 14a. The lift off apparatus 1 further has a stationary body 11a which is connected to the housing 6, and which has a cylindrical recess whose interior surface is covered with several permanent magnetic rings 13a. The permanent magnets 13a are arranged such that they hold the rotor shaft 4 in a resting position during a standstill of the rotary pump, as is represented in the upper part of FIG. 1. The rotor shaft 4 is displaced by an amount S3 in the direction of the thrust force $F_{Schub}$ during the operation of the rotary pump, as is represented in the lower part of FIG. 1, so that the width of the gap decreases from S1 to the distance S2. The largest part of the thrust force $F_{Schub}$ is compensated by the relief apparatus 2a during the operation of the rotary pump. Only during the transitional operation, during decreasing thrust force $F_{Schub}$, does the magnetic lift off apparatus 1 bring about a movement of the rotor shaft 4 in the axial direction. The resting position is defined as the position which the rotor shaft 4 assumes when there is no acting thrust force $F_{Schub}$. The resting position is determined by the lift off apparatus 1.

FIG. 2a shows the rotatable body 12 which is represented in FIG. 1 in a perspective view. Circular ring segment-shaped individual magnet elements 13 are secured to the cylindrical outer surface of the interior body 14, which are arranged in such a manner that three magnet rings 13a, 13b, 13c form. Each magnet ring 13a, 13b, 13c has radially magnetized magnets 13 which are arranged such that each magnet ring 13a, 13b, 13c has a monopolar surface, either a magnetic south pole S or a magnetic north pole N. The magnet ring 13a has a south pole S on the interior surface and a north pole N on its outer surface. The magnet rings 13a, 13b, 13c are arranged to lie next to one another in the axial direction, such that the surface of the body 12 alternately changes polarity in the axial direction.

FIG. 2b shows a magnetic lift off apparatus 1 in a resting position. Circular ring segment-shaped individual magnet elements 13 are arranged at the interior surface of the stationary, cylindrical housing part 11a, such that three magnet rings 14a, 14b, 14c result which are magnetized in the radial direction and which form a hollow cylinder for the accommodation of the rotatable body 12.

FIG. 2c shows two hollow cylindrical individual magnets 13a, 13b which are magnetized in the radial direction, with the individual magnets 13a, 13b being arranged to lie next to one another in the axial direction and having an opposed polarization. FIG. 2d shows a further arrangement of ring-shaped individual magnets 13a, 14a, 14b which are suitable for an arrangement in accordance with FIG. 2b.

Figure 3B:
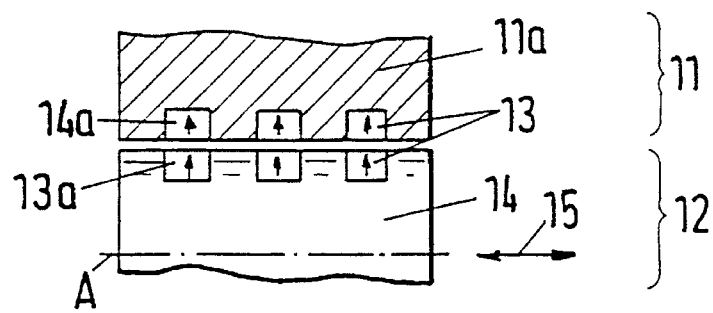

FIG. 3a shows a longitudinal section through the arrangement in accordance with FIG. 2b in a resting position. The interior body 12 which can be rotated about the axis A is movable in the axial direction 15. Magnet rings 13a, 14a which lie opposite to one another in the radial direction have the same magnetization direction in the resting position. The individual magnet rings 13a, 14a which are arranged next to one another in the axial direction have an alternating direction of magnetization. The magnet rings 13a, 14a are distanced in the axial direction in the working example in accordance with FIG. 3b, with the intermediate space consisting of a material with high magnetic permeability, for example soft iron.

Figure 3C:
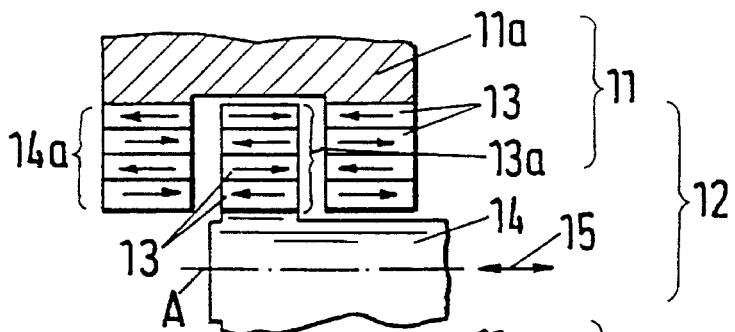
Figure 3D:
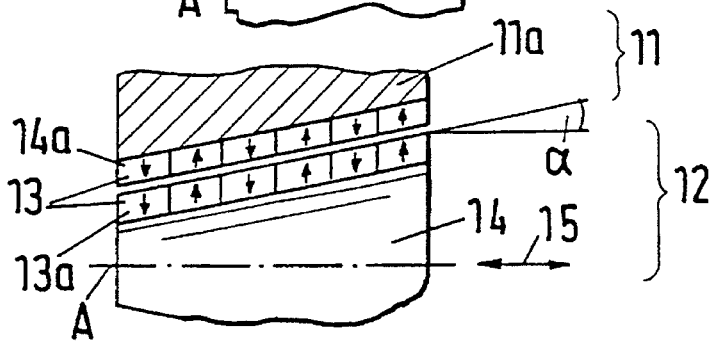
Figure 3E:
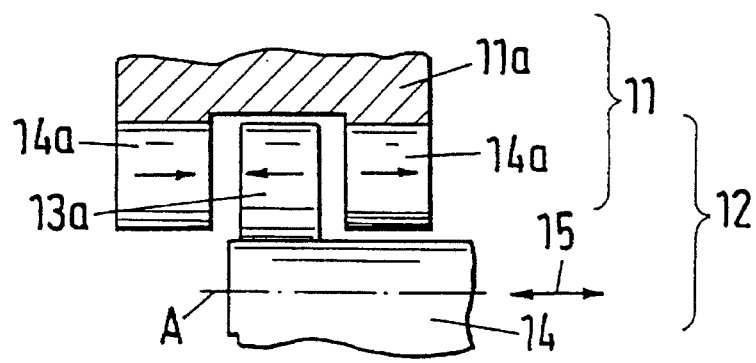

FIG. 3d shows a working example with a conical body 12 which expands in the axial direction by an angle $\alpha$. The stationary body 11 also expands conically, so that the magnet rings 13a, 14a lie opposite to one another while forming a small air gap. FIG. 3e shows a further embodiment with magnet rings 13a, 14a which are magnetized in the axial direction. The magnet rings 13a, 14a lie opposite to one another in the axial direction, with magnet rings 13a, 14a which lie opposite to one another having an opposed polarity. In contrast to an arrangement in accordance with FIG. 3a or with FIG. 3b, a movement of the interior body 14 in the axial direction 15 is only partially possible in the arrangement in accordance with FIG. 3e. In order to increase the magnetically effective forces between the housing part 11a and the interior body 14, the arrangement in accordance with FIG. 3c can prove to be advantageous. A magnet ring 13a, 14a consists of a plurality of individual, cylindrical magnet rings 13 which are arranged to lie next to one another in the radial direction, with adjacent magnet rings 13 each respectively having an opposed polarity.

Figure 4:
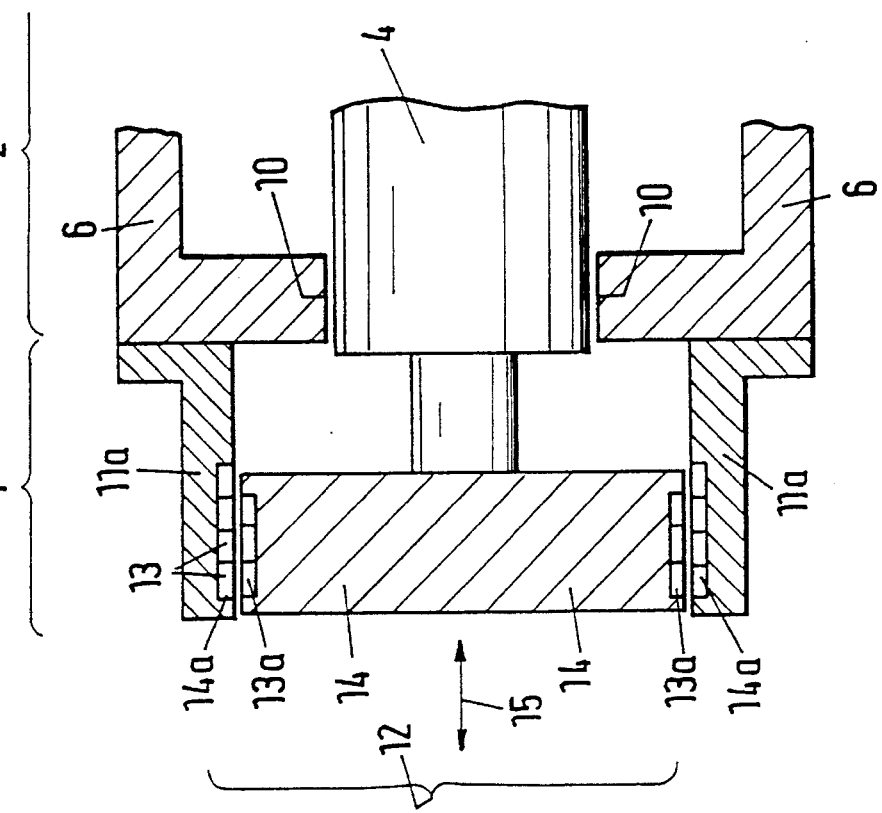
FIG. 4 is a side elevation section of a pump having the magnet array extending between a portion of the pump housing and a rotating disc attached to the shaft; and, FIG. 5 illustrates yet another embodiment similar to FIG. 4 in which the magnet array from the rotating shaft is exterior to housing attached magnet array.

FIG. 4 shows a longitudinal section through a magnetic lift off apparatus 1 which is secured to a rotary pump 2. The lift off apparatus 1 in accordance with the invention can be built onto a present rotary pump 2 by arranging the housing part 11a in a stationary manner, for example, by connecting it with the housing 6. The movable, cylindrical body 12 is connected to the rotor shaft 4 via the interior body 14, with the interior body 14 being held by the rotor shaft 4 which is mounted at several sites and at the bearing 10. The body 12 is movable in the axial direction 15. In the represented working example, four magnet rings 14a are arranged at the housing part 11a and three magnet rings 13a are arranged at the interior body. The shaft 4 and the body 12 are in a resting position with respect to the axial position.

Figure 5:
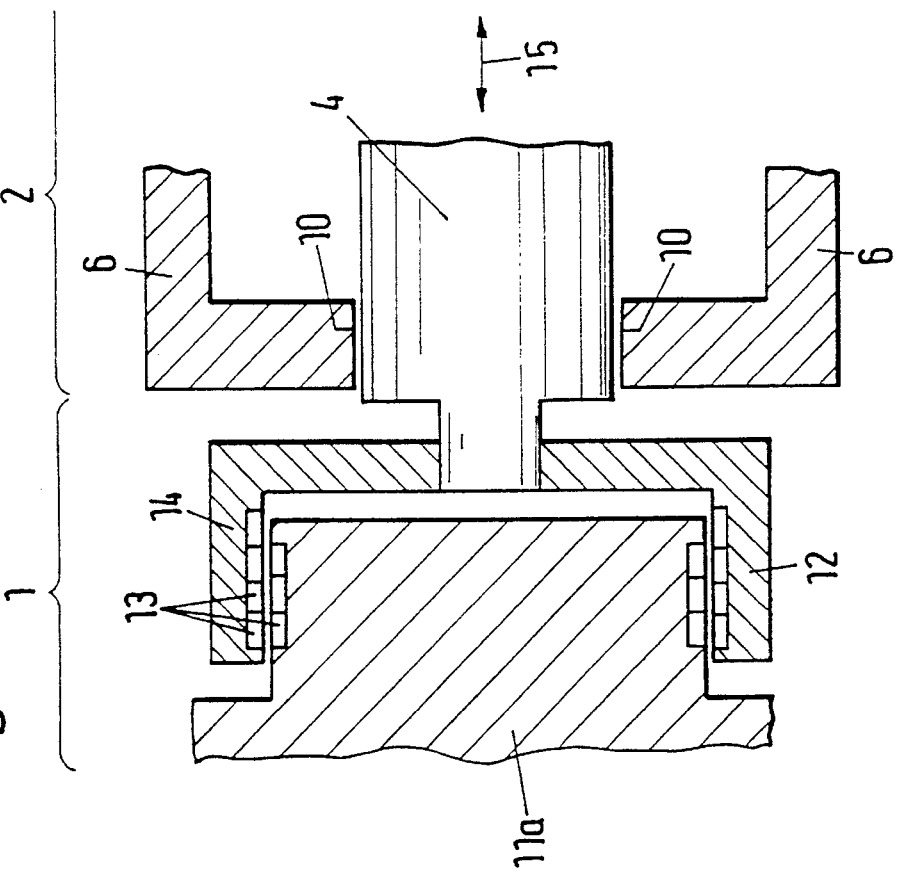

FIG. 5 shows a further working example of a magnetic lift off apparatus 1 which is connected to the rotor shaft 4 of a rotary pump 2. The stationary body 11a is partially cylindrical and the movable body 12 is partially hollow cylindrical, such that the body 11a is arranged inwardly in the radial direction and that the movable body 12 is arranged outwardly in the radial direction.

The apparatus in accordance with the invention for the generation of an axial thrust is suitable for or can be arranged at rotary pumps with a rotor shaft which extends horizontally or vertically.

I claim:

1. In a rotary pump having, a shaft rotatable about a major axis extending centrally of the shaft, at least one impeller attached to the shaft, a pump housing for enclosing the shaft and at least one pump impeller for generating fluid pressure for pumping upon rotation of the shaft and the at least one impeller, the fluid pressure exerting an axial thrust along the major axis of the shaft, means for thrust compensation during rotation of the shaft and the at least one impeller including a first rotatable member attached to the shaft, a second stationary member attached to the pump housing, and a pressure compensation path from the pump housing between the first rotatable member and the second stationary member, the improvement in the means for thrust compensation comprising:

a first set of permanent magnets arrayed around and attached to the shaft;

a second set of permanent magnets arrayed on the pump housing, the second set of permanent magnets overlying and magnetically attracting the first set of permanent magnets to hold the shaft and the at least one impeller at a fixed position along the major axis of the shaft with respect to the pump housing;

whereby upon rotation of the shaft generating the axial thrust along the major axis of the shaft the first set of permanent magnets and the second set of permanent magnets opposes movement of the shaft along the major axis of the shaft with respect to the housing.

2. In a rotary pump according to claim 1 and wherein:

the first set of permanent magnets and the second set of permanent magnets have corresponding conical arrays.

3. In a rotary pump according to claim 1 and wherein:

the first set of permanent magnets is attached to the first rotatable member; and, the second set of permanent magnets is attached to the second stationary member.

4. In a rotary pump according to claim 1 and wherein:

the first set of permanent magnets and the second set of permanent magnets are ring shaped.

5. In a rotary pump according to claim 4 and wherein:

the first set of permanent magnets includes a plurality of ring shaped permanent magnets; and, the second set of permanent magnets includes a corresponding plurality of ring shaped magnets.

6. In a rotary pump according to claim 1 and wherein:

the first set of permanent magnets are radially arrayed outward and around the shaft and the second set of permanent magnets are radially arrayed inward from the housing.

7. In a rotary pump according to claim 6 and wherein:

the first set of permanent magnets are magnetized with a first pole of the permanent magnets aligned toward the shaft and a second pole of the permanent magnets aligned away and outward of the shaft; and, the second set of permanent magnets are magnetized with a second pole of the permanent magnets aligned toward the first pole of the permanent magnets on the shaft and the second pole of the second set of permanent magnets aligned away and outward from the first permanent magnets.

8. In a rotary pump according to claim 6 and wherein:

the first set of permanent magnets are magnetized with a first pole of the permanent magnets aligned along the major axis of the shaft and a second pole of the permanent magnets aligned along the major axis of the shaft; and, the second set of permanent magnets are magnetized with a second pole of the permanent magnets aligned toward the first pole of the permanent magnets on the shaft and the second pole of the second set of permanent magnets aligned toward the first pole of the first set permanent magnets.

9. A rotary pump comprising:

a shaft rotatable about a major axis extending centrally of the shaft;

at least one impeller attached to the shaft;

a pump housing for enclosing the shaft and at least one pump impeller for generating fluid pressure for pumping upon rotation of the shaft and the at least one impeller, the fluid pressure exerting an axial thrust along the major axis of the shaft;

means for thrust compensation during rotation of the shaft and the at least one impeller including a first rotatable member attached to the shaft, a second stationary member attached to the pump housing, and a pressure compensation path from the pump housing between the first rotatable member and the second stationary member;

a first set of permanent magnets arrayed around and attached to the shaft;

a second set of permanent magnets arrayed on the pump housing, the second set of permanent magnets overlying and magnetically attracting the first set of permanent magnets to hold the shaft and the at least one impeller at a fixed position along the major axis of the shaft with respect to the pump housing;

whereby upon rotation of the shaft generating the axial thrust along the major axis of the shaft the first set of permanent magnets and the second set of permanent magnets opposes movement of the shaft along the major axis of the shaft with respect to the housing.

* * * * *